This invention relates to procedure for molding a tubular handle grip, of initially plastic material such as a vulcanizible soft-rubber composition, upon an elongate, rod-like internal molding member or mandrel, or directly upon a golf-club shaft, to which the grip may be secured by vulcanized adhesion during the molding operation. The invention is applicable, however, to the molding of a grip in removable relation to the internal molding member, for subsequent application of the grip to a golf-club or the like.

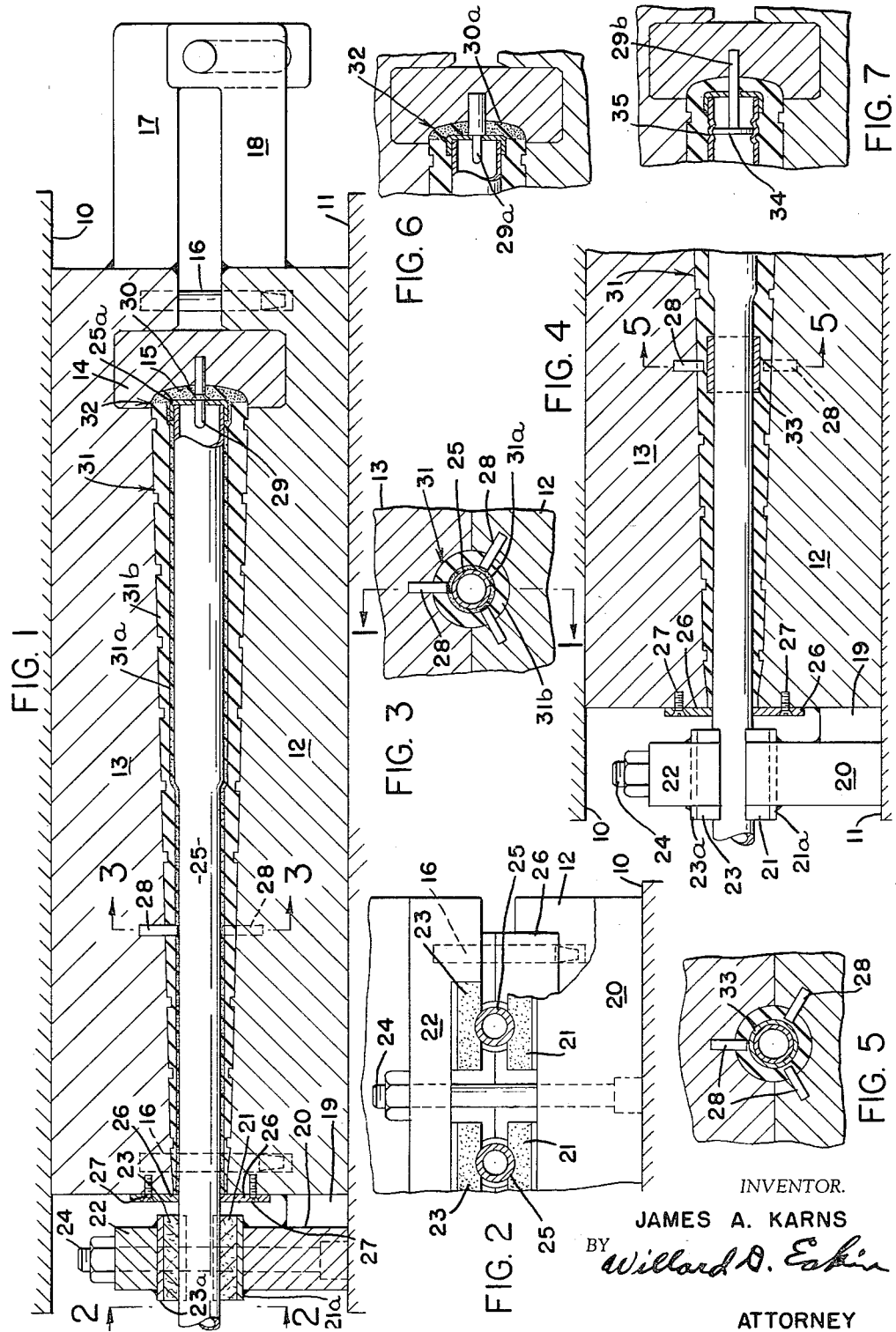
May 28, 1963 — J. A. KARNS — 3,090,999
METHOD FOR MAKING A HAND GRIP
Filed Sept. 23, 1957
INVENTOR.
JAMES A. KARNS
BY Willard D. Eakin
ATTORNEY 3,090,999
METHOD FOR MAKING A HAND GRIP
James A. Karns, Akron, Ohio, assignor to Fawick Flexi-Grip Co., a corporation of Ohio
Filed Sept. 23, 1957, Ser. No. 685,517
1 Claim. (Cl. 18—59)

The chief object of the invention is to provide a method adapted for the manufacture, with a minimum of mold equipment cost, of grips and grip assemblies of various sizes and characteristics and without requiring extreme care in the charging of the mold with the moldable blanks of stock.

More specific objects with regard to such characteristics will appear hereinafter.

The nearest approach to my present invention is in my U.S. Patent 2,604,660, in which a golf-club shaft is centered in a constricting or squeeze type mold by a mold pin, hereinafter called an end pin, engaging an end of the shaft, and my U.S. Patent 2,604,661, in which a grip-receiving part of the shaft is centered in the mold by a circumferentially spaced set or sets of mold pins, hereinafter called side pins, that extend, through the stock being molded, substantially to the shaft.

In molding the grips, and especially in such squeeze type molds, such high pressure is employed for shaping and compacting the stock that the golf-club shaft or other internal molding member is subject to being bent slightly by unbalanced pressures of the stock unless it is prevented by the centering means, and any such bending is especially objectionable in the case of a golf-club grip because it results in a finished golf club not having the perfect "balance" that is demanded by golfers.

The end-pin centering, even when used in conjunction with shaft-centering means at the other end of the grip-receiving part of the shaft, may permit such bending of the shaft when extensive flow of a stiff stock is required in the shaping operation, and the side-pin centering as heretofore used, without concurrent end-pin centering, has limited the bending to permissible tolerances only when the dimensions were such as to bring the side pins substantially into contact with the shaft or mandrel in the final closing of the mold. This necessitates using for each size of shaft or mandrel a mold having pins of the particular length required, which is a matter of high equipment cost.

Also it is desirable to mold the grip with an integral end wall or cap, the thickness of which depends upon the lengthwise position of the shaft or mandrel in the mold cavity, and difficulty has been encountered in the manual positioning of the shaft or mandrel lengthwise of the cavity, for gripping of the shaft or mandrel, by holding means at a distance from the cavity, to hold the internal molding member against lengthwise movement under the force of the cap stock pressing against the mold-enclosed end face of the member.

Another problem solved by the present invention is that of providing the sometimes required special weighting means in the upper end portion of a golf club, with neatness of appearance and exclusion of moisture from the structure in the vicinity of the weighting means and with minimum expense.

Of the accompanying drawings:

FIG. 1 is a vertical section, on line 1—1 of FIG. 3, taken lengthwise of one of the mold cavities, of a plural-cavity mold embodying my invention in its preferred form, with fragmentary showing of the heated platens of the usual vulcanizing press for closing and heating the mold.

FIG. 2 is a section on line 2—2 of FIG. 1.
FIG. 3 is a section on line 3—3 of FIG. 1.
FIG. 4 is a section corresponding substantially to that of FIG. 1 but showing a modified manner of use of the apparatus.
FIG. 5 is a section on line 5—5 of FIG. 4.
FIG. 6 is a fragmentary section corresponding to a part of FIG. 1 but with a modified form of centering end pin.
FIG. 7 is a similar section showing another modification.

The apparatus shown in FIGS. 1 to 3 comprises the usual heated press platens 10, 11 and, mounted therein, a mold assembly comprising a lower mold section 12, an upper mold section 13, and an end-cap molding bar 14 formed with a molding-recess face 15 for each of the molding cavities of the plural-cavity mold sections. As in known practice the bar 14 has a sliding fit in complementary recesses in the lower and upper mold sections 12, 13 and the upper mold section slides downward on the bar in the closing of the mold, which is provided also with the usual dowels 16, 16 and lost-motion hinge brackets 17, 18.

The mold sections can be provided with the usual overflow channels or recesses (not shown) in the vicinities of the molding cavities that they define.

At its side remote from the hinge the lower mold section has secured to it by brackets such as the bracket 19, FIGS. 1 and 4, a lower clamping bar 20 having mounted on its upper side the usual set of suitably shaped clamping pads 21, 21, of stiff but slightly resilient composition such as fiber-containing, vulcanized soft-rubber. An upper clamping bar 22, having a set of similar pads 23, 23 on its under side, is adapted to be urged downward by manually tightened clamping bolts 24 extending through the two clamping bars, to grip the set of internal molding members, such as the golf-club shaft 25.

The pads can be secured to respective plates 21a, 23a welded to the respective clamping bars 20, 22, or they can be unattached for substitution of different pads for shafts or mandrels of different sizes.

The clamping bars 20, 22 are here shown as being closer to the mold sections 12, 13 than is best for unobstructed manual manipulation of the clamping bar 22 and associated parts, but the length of the brackets 19 can of course be different in different assemblies.

To permit the use of club shafts or mandrels of less than maximum diameter without excessive escape of stock from the mold through the annular space around the shaft, adapter plates 26, 26, suitably shaped for the respective shaft sizes, are secured to the mold sections 12, 13 by screws 27, 27.

One set of centering side pins such as are above referred to are shown at 28, 28, press-fitted in holes in the mold sections 12, 13 and adapted to extend through the stock substantially into contact with a shaft or mandrel of the largest size, or into close proximity to the shafts or mandrels of smaller sizes. A plurality of such sets of pins, spaced apart lengthwise of the mold cavity, of course can be used.

A centering end pin 29 for each molding cavity is mounted at the center of the molding-recess face 15 above described, as by a press fit in a hole in the bar 14, the pin projecting from the bar into the molding cavity defined by the set of mold members.

The novel feature of the end pin 29 is that it has a stop shoulder provided by a conical flange 30 formed on the pin, to be abutted by the metal end-cap 25a of the golf-club shaft to determine the final thickness of the composition end cap or wall 32 of the molded grip 31.

In my procedure separately formed blanks of stock are mounted respectively in the lower mold section 12, the upper mold section 13, and the end-cap forming recess 15, and this makes it feasible to use for the end-cap a weighted stock such as a rubber composition containing a suitable amount of a comminuted weighting material such as litharge. Also a more moderately weighted stock, such as a rubber composition containing a suitable amount of comminuted zinc oxide, can be used as a tubular layer next to the shaft 25, with a lighter and more resilient surface layer overlying it for contact of the player's hands. The inner, weighted layer is shown at 31a and the outer layer at 31b.

Preferably the blank for the end cap 32 is formed with a central hole to accommodate the centering end pin 29, onto which it is stretched or buttoned in mounting the blank in the molding recess 15. Permissibly after the shaft and all of the blanks have been placed in the mold and the mold partially closed, the shaft is manually shoved inward until the metal end cap 25a of the shaft is stopped by the flange 30 of the pin 29, the shaft then being held in that position by tightening of the nuts on the clamping bolts 24.

The invention is applicable also to the application of a listing, of an initially plastic material, to the shaft, in place of the complete grip 31, for the later application of a spirally wrapped leather or other surface layer to the listing.

Further details of the molding procedure are in accordance with practices well known to those skilled in the art.

I find that when both the centering end pin 29 and the centering side pins 28 are used, shafts of less than maximum diameter, within a substantial range of difference, are held against excessive bending in the final closing of the mold.

For still smaller shafts or mandrels a spacer ring or bushing 33, FIGS. 4 and 5, can be frictionally mounted upon the shaft at the position of each set of the side pins 28, to position the shaft in relation to the adjacent inner ends of the pins, and left in the shaft and grip assembly as a permanent part thereof. Such a bushing preferably is formed of a fiber-containing rubber composition and partly or completely vulcanized, for suitable hardness, before it is mounted upon the shaft.

In FIG. 1, the inner layer 31a of relatively stiff stock provides to a substantial degree the centering effect of the bushing 33 of FIG. 4.

The conical shape of the centering end pin's stop flange 30, FIG. 1, permits the flange to be withdrawn easily from the finished product, with only a small hole in the end cap 32, to be later filled, if desired.

In the modification shown in FIG. 6 the centering end pin, 29a, is formed with a shoulder 30a between large and small cylindrical parts of the pin, which makes it still easier to remove the finished product from the pin but leaves a larger hole, to be filled, if desired.

For still easier removal, the tubular golf shaft can be provided with an internal stop disc 34, FIG. 7, held in place by swaging the wall of the shaft as shown at 35, to be abutted by the end of a slender, cylindrical, centering end pin 29b.

The invention provides, individually and collectively, the advantages above indicated and can be further modified without departure from the scope of the appended claim.

I claim:

In the method of forming a plastic covering over an end of an elongate tubular shaft during the formation of a hand grip thereon, using an elongate cavity in a mold provided with a molding-recess face at one end of the cavity with positioning means projecting from said face, the positioning means being separate from the shaft and grip and being located in the mold, the other end of the cavity being open, there being an opening in said end of the shaft adapted to receive the inner end of the positioning means with a snug fit; the steps which comprise placing plastic in the mold to cover said end of the shaft, placing the shaft in the mold with a portion projecting through the open end thereof, and then manually shoving the shaft toward said face in the closed end of the cavity until a portion of the shaft is brought into abutting relation with a surface of the positioning means before the entire length of the positioning means passes through the opening, thereby spacing the end of the shaft from said face and producing a covering of the plastic of predetermined thickness on the end of the shaft.

References Cited in the file of this patent

UNITED STATES PATENTS

| | | |
|---|---|---|
| 2,103,889 | Brisnick | Dec. 28, 1937 |
| 2,252,054 | Welch | Aug. 12, 1941 |
| 2,604,660 | Karns | July 29, 1952 |
| 2,604,661 | Karns | July 29, 1952 |